(12) United States Patent
Rain et al.

(10) Patent No.: US 10,386,926 B2
(45) Date of Patent: Aug. 20, 2019

(54) HAPTIC MAPPING

(71) Applicant: Intel Corporation, Santa Clara, CA (US)

(72) Inventors: Guy Rain, Yad Natan (IL); Dor Levy, Jerusalem (IL); Ofir Natan, En Yaakov (IL); Ohad Zur, Modiin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,389

(22) Filed: Sep. 25, 2015

(65) Prior Publication Data

US 2017/0090570 A1 Mar. 30, 2017

(51) Int. Cl.
*G06F 3/01* (2006.01)
*G06T 19/00* (2011.01)

(52) U.S. Cl.
CPC .............. *G06F 3/016* (2013.01); *G06F 3/011* (2013.01); *G06F 3/014* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,714,901 B1 * | 3/2004 | Cotin | B25J 9/1689 434/262 |
| 8,451,323 B1 | 5/2013 | Poursohi et al. | |
| 2002/0021277 A1 * | 2/2002 | Kramer | G06F 3/016 345/156 |
| 2007/0216642 A1 | 9/2007 | Kneissler | |
| 2009/0278798 A1 * | 11/2009 | Kim | G06F 3/011 345/158 |
| 2011/0261083 A1 | 10/2011 | Wilson | |
| 2012/0038639 A1 * | 2/2012 | Mora | G06T 15/04 345/420 |
| 2013/0187930 A1 * | 7/2013 | Millman | G06T 13/20 345/473 |
| 2013/0307827 A1 | 11/2013 | Reisman et al. | |
| 2014/0015831 A1 | 1/2014 | Kim et al. | |
| 2014/0375769 A1 * | 12/2014 | Algreatly | G06F 17/50 348/46 |
| 2016/0147304 A1 * | 5/2016 | Lund | G06F 3/016 715/702 |

OTHER PUBLICATIONS

Salisbury, Kenneth, Francois Conti, and Federico Barbagli. "Haptic rendering: introductory concepts." IEEE computer graphics and applications 24.2 (2004): 24-32. (Year: 2004).*
International Search Report and Written Opinion for International Patent Application No. PCT/US2016/048045, dated Dec. 21, 2016, 12 pages.
International Preliminary Report on Patentability for International Patent Application No. PCT/US2016/048045, dated Apr. 5, 2018, 9 pages.

* cited by examiner

*Primary Examiner* — Yu Chen
(74) *Attorney, Agent, or Firm* — Jordan IP Law, LLC

(57) ABSTRACT

Systems, apparatuses, and methods may include recording forces from manipulation of a three-dimensional object by a haptic user interface and generating a digital electrical representation of the three-dimensional object from the recorded forces and from a visual representation of the three-dimensional object.

20 Claims, 5 Drawing Sheets

| SW State/position | Voltage | Flexer's Angle |
|---|---|---|
| 1 (Max tension) | 0.8 |  |
| 2 | 0.6 |  |
| 3 | 0.4 |  |
| 4 | 0.2 |  |
| 5 (Fully flexible) | 0 |  |

HAPTIC MAPPING

TECHNICAL FIELD

Embodiments generally relate to haptic representations of three-dimensional objects. More particularly, embodiments relate to methods, apparatuses, and systems that map parameters to provide haptic representations of three-dimensional objects.

BACKGROUND

Currently many visual objects may be presented on user interfaces in a variety of environments (for example, augmented reality, computer games, interactive displays, etc.). Although the objects can be seen, there may be limited and/or unrealistic physical feedback from the objects being viewed.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
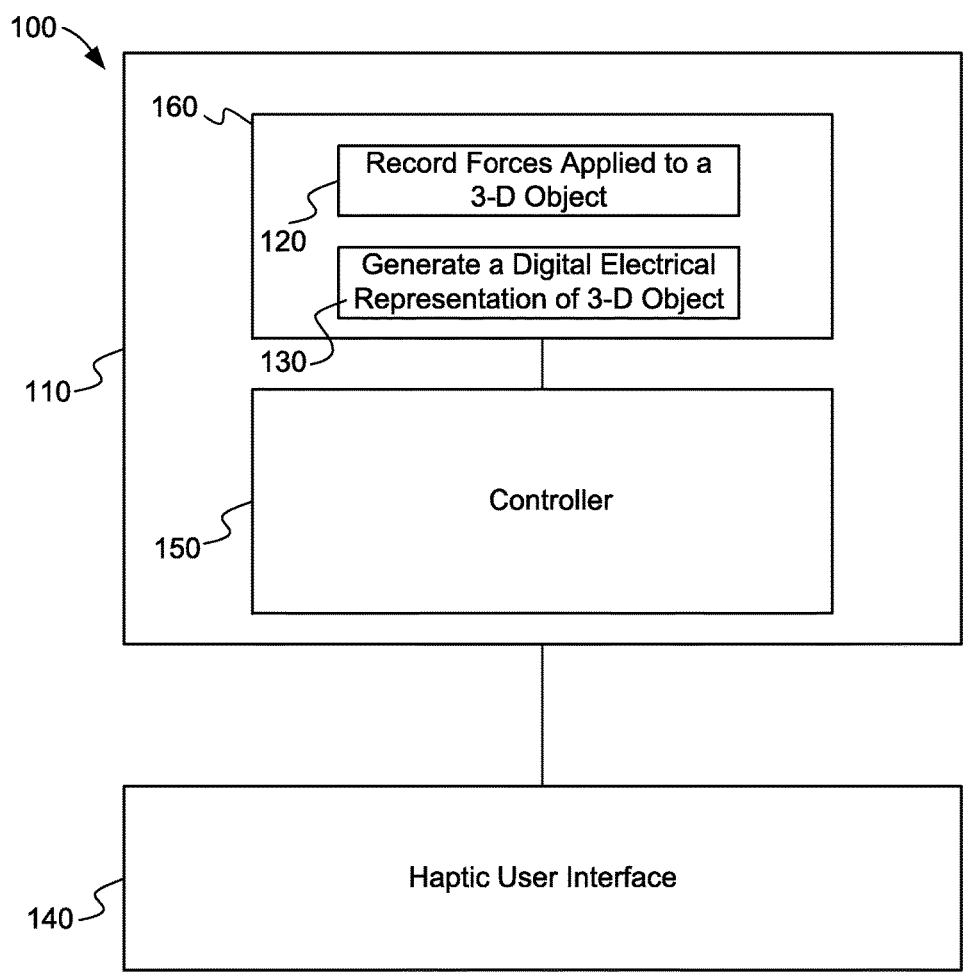
FIG. 1 is a block diagram of an example of a system including a haptic user interface according to an embodiment.

Turning now to FIG. 1, a haptic mapping system 100 includes logic, implemented at least partly in configurable or fixed-functionality hardware 110, having a processor 160 that includes a portion 120 to record forces applied to a three-dimensional (3D) object and a portion 130 to generate a digital electrical representation of the three-dimensional object. Optionally, a controller 150, such as an analog-to-digital controller, may record electrical parameters from a haptic user interface 140. The illustrated hardware 110 may communicate with a haptic user interface 140 that manipulates a three-dimensional object in order to provide haptic mapping. As used herein, the expression "haptic mapping" may relate to a determination of the parameters used in a haptic user interface to simulate actual interaction with a three-dimensional object.

The expression "haptic user interface" may relate to any type of user interface that provides a tactile sensation to the user. Examples of haptic user interfaces may include wearable devices such as gloves, vests, and footwear, and surfaces such as touchpads. For example, the illustrated haptic user interface 140 may include a variety of materials having characteristics that are changeable through the application of an external stimulus such as an electric current or voltage. Such materials may include electroactive polymers, ionic polymer-metal composites, piezoelectric materials, microfluidic materials, electrostatic materials, and so forth. Typically, these materials change a dimension in response to an external stimulus or trigger or are actuated by an external stimulus such as microfluidic actuators.

Figure 2:
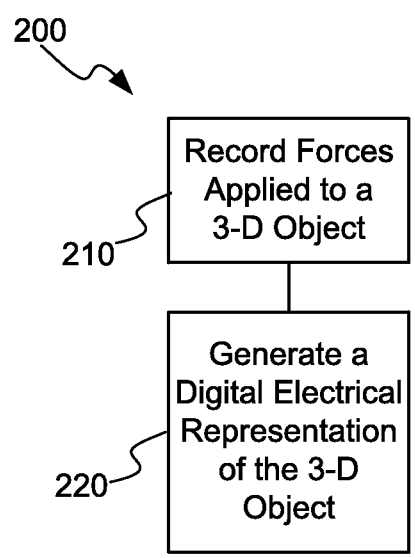
FIG. 2 is a flowchart of an example of a method of haptic mapping according to an embodiment.

In use, the system 100 of FIG. 1 may perform a method 200 depicted in FIG. 2. With continuing reference to FIGS. 1 and 2, the method 200 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. At illustrated block 210, the hardware 110 records forces from manipulation of a three-dimensional object. One technique of recording forces may include using the controller 150 to convert analog output from the haptic user interface 140 to digital output. In one optional aspect, a low power electrical source may apply power to the haptic user interface 140, and as the interface interacts with the three-dimensional object, changes in electrical parameters from the material of the haptic user interface may be recorded. For example, one electrical parameter that may be recorded is a change in an output voltage of the haptic user interface 140 as it manipulates the three-dimensional object. That is, as the haptic user interface 140 applies a force to a three-dimensional object, that object may have a reactive force on the haptic user interface and this reactive force may be measured as a change in voltage output by the haptic user interface 140.

At illustrated block 220, a digital electrical representation of the three-dimensional object is generated. An image of the three-dimensional object, optionally a three-dimensional image of the object, may be combined with the recorded forces from manipulation of the three-dimensional object from illustrated block 210 to create the digital electrical representation of the three-dimensional object. As a result, the parameters needed for the haptic user interface 140 (or another haptic use interface) to simulate actual interaction with a three-dimensional object may be determined.

Figure 3:
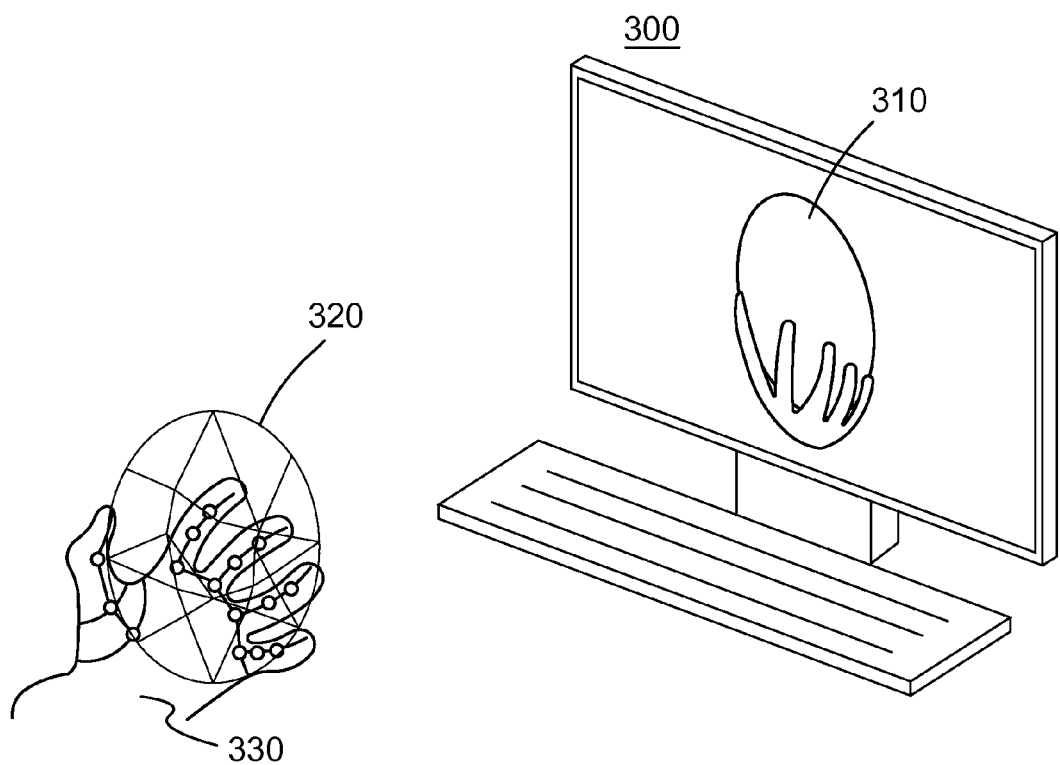
FIG. 3 is a perspective view of an example of a haptic mapping system including a haptic user interface according to an embodiment.

Turning to FIG. 3, an example of a haptic mapping system 300 is depicted. Here, a haptic user interface is a haptic glove 330 that is interacting with a three-dimensional object 320 such as, for example, a sphere. A user's hand may be inserted into the haptic glove 330 for manipulation of the object 320. Depending upon the material used to fabricate the object 320, there may be considerable resistance to the object 320 (for example, a sphere constructed of wood) or there may be little resistance to the object 320 (for example, a sphere constructed of foam). Further, the resistance may be variable, as with a rubber sphere: a softer resistance at first and then a firmer resistance as the object is deformed. Another example of a variable resistance object is the trigger of a gun. Initial actuation of the trigger may produce high resistance but continuous actuation eventually leads to low resistance. By recording the changes in voltage output by the glove, the reactive force at the glove by the object 320 being manipulated may be determined for each position of the manipulation.

During the haptic mapping, a three-dimensional scan of the three-dimensional object 320 may also be performed forming an image 310. Using the object dimensions relative to the haptic glove 330, the actual object dimensions may be deduced. The position of haptic glove 330 on the object 320 may be recorded at the same time the reactive forces on the glove 330 are recorded. Thus, the changes in object resistance over the entire surface of the object 320 may be accurately determined. Three-dimensional visual mapping may therefore be associated with parameters recorded from the haptic user interface to create a more complete electronic representation of a three-dimensional object.

Figure 4:
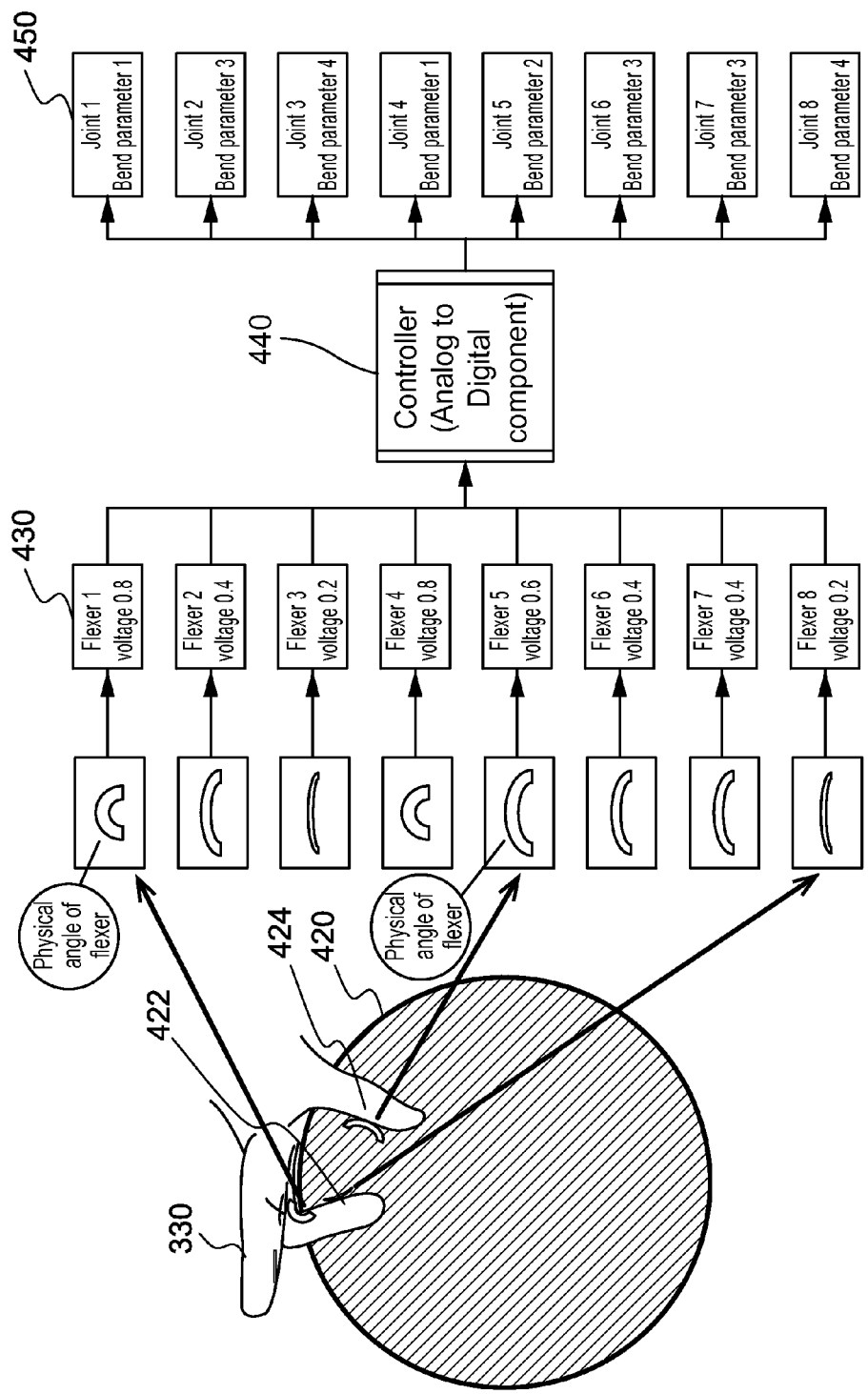
FIG. 4 is a block diagram of an example of a system including a haptic user interface and an object according to an embodiment.

Turning to FIG. 4, the haptic glove 330 is depicted manipulating a three-dimensional object with visually-hidden recesses such as a bowling ball 420. The visually-hidden recesses 422 and 424 are manipulated by the haptic glove 330 even though a three-dimensional image may not be able to depict the inside of the recesses 422 and 424. The haptic mapping combined with the visual mapping may record a position of the haptic glove 330 and the placement of various glove fingers within the recesses when the bowling ball 420 is being gripped by the haptic glove 330. Using a digital electrical representation of the bowling ball 420, for example, in a video bowling game, the user of the haptic glove 330 may be provided with the sensation of the recesses 422 and 424 and may be able to experience the resistance involved with gripping the bowling ball 420.

As further seen in FIG. 4, examples of a degree of flexure at various positions of haptic glove 330 are recorded along with a corresponding measured voltage depicted in column 430. This information may be passed to a controller 440, which may be an analog to digital controller. The illustrated information becomes part of the digital electrical representation of bowling ball 420 in column 450. Combined with imaging the bowling ball 420, a complete digital electrical representation may be created for use in future haptic representations of the bowling ball 420.

Figure 5:
FIG. 5 is a table showing the shape of an electroactive polymer material for an applied voltage according to an embodiment.
Figure 5:
Figure 5:
Figure 5:
Figure 5:
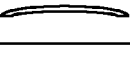

Using the recorded forces from manipulation of a three-dimensional object by the haptic user interface, hardware 110 (FIG. 1) may determine the degree of rigidity or flexure of each individual segment of the haptic user interface such as the haptic glove 330. Examples of the degree or rigidity of flexure of various segments of haptic glove 330 are also depicted in FIG. 4. For haptic glove materials that respond to a voltage in order to change a degree of bending of the material, a chart is depicted in FIG. 5 that provides examples of voltages corresponding to degrees of flexure (flexer's angle). Thus hardware 110 (FIG. 1), having recorded the various degrees of rigidity or flexure of each segment of the haptic glove 330 (FIGS. 3 and 4) may determine a voltage to be applied to the haptic glove 330 (FIGS. 3 and 4) to simulate manipulation of the object 320 (FIG. 3). This voltage would be applied, for example, as a user manipulates a virtual object on a display with a hand positioned inside the haptic glove 330 (FIGS. 3 and 4).

Together with images of the three-dimensional object, the hardware portion 130 (FIG. 1) may generate a digital electrical representation of the three-dimensional object from the recorded forces. Using this digital electrical representation of the three-dimensional object, for example, the object 320 (FIG. 3), the object's image may be displayed to a user who wears the haptic glove 330 (FIGS. 3 and 4). An image of a hand manipulating the object is displayed along with the object, in the illustrated example. As the hand manipulates the object on the display, the corresponding degrees of rigidity or flexure are provided to the haptic glove 330 (FIGS. 3 and 4) to simulate the feel of an actual three-dimensional object being touched by the user.

For example, the haptic mapping of the above embodiments may be applied in an augmented or virtual reality environment such as a game. The user may interact with a haptic user interface that incorporates a material that responds to electrical communication from a controller. The electrical communication from the controller is determined from the above haptic mapping embodiments. The voltage may control a degree of flexure of the haptic user interface as the user views a virtual interaction on a display. When various degrees of flexure are applied to a haptic user interface, the user may experience sensations similar to actually feeling or holding the object shown on the display.

Thus, embodiments described above may facilitate haptic mapping of objects by correlating images with recordation of forces during object manipulation. A digital electrical representation of the three-dimensional object from recorded forces and from a visual image of the three-dimensional object may be generated. Using this representation, a digital library of objects may be created. During development of video games or robotic surgery simulation exercises, a developer may access the digital library and use the digital representation to create a realistic interactive experience with an object being viewed. For example, a user can see a hand interacting with an object and change the position of the hand while being able to realistically experience the resistance of the object through the haptic user interface. This may be used in various virtual environments including augmented reality. There are numerous applications of the embodiments described above. For example, simulators such as surgery simulators and flight simulators could provide realistic haptic feedback to the simulator user. Robotic interfaces for surgery and toxic waste manipulation may provide the user with the feel of the object with which he/she is interacting. Haptic user interfaces may also be used to interact with displays such as in the context of a "virtual mouse" when provided with feedback sensors.

ADDITIONAL NOTES AND EXAMPLES

Example 1 may include a haptic mapping system including a haptic user interface, logic, implemented at least partly in one or more of configurable or fixed-functionality hardware, to record forces from manipulation of a three-dimensional object by the haptic user interface, and generate a digital electrical representation of the three-dimensional object from recorded forces and from a visual image of the three-dimensional object.

Example 2 may include the system of example 1, wherein the hardware includes one or more of a processor or a controller.

Example 3 may include the system of example 1, wherein the haptic user interface is a wearable device.

Example 4 may include the system of example 1, wherein the logic determines a degree of rigidity or flexure to be applied to different segments of the haptic user interface to simulate manipulation of the three-dimensional object.

Example 5 may include the system of example 4, wherein the logic determines electrical parameters to create the degree of rigidity or curvature to be applied to the different segments of the haptic user interface to simulate manipulation of the three-dimensional object.

Example 6 may include the system of any one of examples 1-5, wherein haptic user interface includes one or more materials selected from electroactive polymers, ionic polymer-metal composites, piezoelectric materials, microfluidic materials, or electrostatic materials.

Example 7 may include a haptic mapping apparatus including logic, implemented at least partly in one or more of configurable or fixed-functionality hardware, to record forces from manipulation of a three-dimensional object by a haptic user interface; and generate a digital electrical representation of the three-dimensional object from recorded forces and from a visual representation of the three-dimensional object.

Example 8 may include the apparatus of example 7, wherein the hardware includes one or more of a processor or a controller.

Example 9 may include the apparatus of example 7, wherein the logic determines a degree of rigidity or flexure to be applied to different segments of the haptic user interface to simulate manipulation of the three-dimensional object.

Example 10 may include the apparatus of example 9, wherein the logic determines electrical parameters to create the degree of rigidity or curvature to be applied to the different segments of the haptic user interface to simulate manipulation of the three-dimensional object.

Example 11 may include the apparatus of example 7, wherein the haptic user interface is to include one or more materials selected from electroactive polymers, ionic polymer-metal composites, piezoelectric materials, microfluidic materials, or electrostatic materials.

Example 12 may include a haptic mapping method including recording forces from manipulation of a three-dimensional object by a haptic user interface; and generating a digital electrical representation of the three-dimensional object from recorded forces and from a visual image of the three-dimensional object.

Example 13 may include the method of example 12, wherein recording forces includes measuring electrical parameters from the haptic user interface during three-dimensional object manipulation.

Example 14 may include the method of example 12, wherein the visual image is a three-dimensional visual image of the three-dimensional object.

Example 15 may include the method of example 12, further comprising determining a degree of rigidity or flexure to be applied to different segments of the haptic user interface to simulate manipulation of the three-dimensional object.

Example 16 may include the method of example 15, further comprising determining electrical parameters to create the degree of rigidity or curvature to be applied to the different segments of the haptic user interface to simulate manipulation of the three-dimensional object.

Example 17 may include at least one computer readable storage medium comprising a set of instructions which, when executed by a computing device, cause the computing device to record forces from manipulation of a three-dimensional object by a haptic user interface, and generate a digital electrical representation of the three-dimensional object from recorded forces and from a visual image of the three-dimensional object.

Example 18 may include the at least one computer readable storage medium of example 17, wherein the instructions, when executed, cause the computing device to measure electrical parameters from the haptic user interface during three-dimensional object manipulation.

Example 19 may include the at least one computer readable storage medium of example 17, wherein the visual image is a three-dimensional visual image of the three-dimensional object.

Example 20 may include the at least one computer readable storage medium of example 17, wherein the instructions, when executed cause the computing device to determine a degree of rigidity or flexure to be applied to different segments of the haptic user interface to simulate manipulation of the three-dimensional object.

Example 21 may include the at least one computer readable storage medium of example 20, wherein the instructions, when executed, cause the computing device to determine electrical parameters to create the degree of rigidity or curvature to be applied to the different segments of the haptic user interface to simulate manipulation of the three-dimensional object.

Example 22 may include a haptic mapping apparatus including means for recording forces from manipulation of a three-dimensional object by a haptic user interface, and means for generating a digital electrical representation of the three-dimensional object from recorded forces and from a visual image of the three-dimensional object.

Example 23 may include the apparatus of example 22, wherein the visual image is a three-dimensional visual image of the three-dimensional object.

Example 24 may include the apparatus of example 22, further comprising means for determining a degree of rigidity or flexure to be applied to different segments of the haptic user interface to simulate manipulation of the three-dimensional object.

Example 25 may include the apparatus of example 24, further comprising means for determining electrical parameters to create the degree of rigidity or flexure to be applied to the different segments of the haptic user interface.

Example 26 may include the apparatus of example 22, wherein the haptic user interface is to include one or more materials selected from electroactive polymers, ionic polymer-metal composites, piezoelectric materials, microfluidic materials, or electrostatic materials.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a haptic user interface; and
   logic, implemented at least partly in one or more of configurable or fixed-functionality hardware, to:
   record levels of flexure and forces of reaction detected at the haptic user interface arising from manipulation of a real three-dimensional object lying outside of the haptic user interface by the haptic user interface, wherein the forces of reaction are equal in magnitude and opposite in direction to forces applied to the three-dimensional object by the haptic user interface;
   generate a digital electrical representation of the real three-dimensional object from the recorded levels of flexure and forces of reaction and from a visual image of the three-dimensional object; and
   determine, based on the digital electrical representation of the real three-dimensional object, an amount of flexure to be applied to each of different segments of the haptic user interface to simulate manipulation of the real three-dimensional object.

2. The system of claim 1, wherein the hardware includes one or more of a processor or a controller.

3. The system of claim 1, wherein the haptic user interface is a wearable device.

4. The system of claim 1, wherein the logic determines a degree of rigidity to be applied to each of the different segments of the haptic user interface to simulate manipulation of the real three-dimensional object.

5. The system of claim 4, wherein the logic determines electrical parameters to create each degree of rigidity and each level of flexure to be applied to the different segments of the haptic user interface to simulate manipulation of the real three-dimensional object.

6. The system of claim 1, wherein haptic user interface includes one or more materials selected from electroactive polymers, ionic polymer-metal composites, piezoelectric materials, microfluidic materials, or electrostatic materials.

7. An apparatus comprising:
   logic, implemented at least partly in one or more of configurable or fixed-functionality hardware, to:
   record levels of flexure and forces of reaction detected at a haptic user interface arising from manipulation of a real three-dimensional object lying outside of the haptic user interface by the haptic user interface, wherein the forces of reaction are equal in magnitude and opposite in direction to forces applied to the three-dimensional object by the haptic user interface;
   generate a digital electrical representation of the real three-dimensional object from the recorded levels of flexure and forces of reaction and from a visual representation of the three-dimensional object; and
   determine, based on the digital electrical representation of the real three-dimensional object, an amount of flexure to be applied to each of different segments of the haptic user interface to simulate manipulation of the real three-dimensional object.

8. The apparatus of claim 7, wherein the hardware includes one or more of a processor or a controller.

9. The apparatus of claim 7, wherein the logic determines a degree of rigidity to be applied to each of the different segments of the haptic user interface to simulate manipulation of the real three-dimensional object.

10. The apparatus of claim 7, wherein the logic determines electrical parameters to create each degree of rigidity and each level of flexure to be applied to the different segments of the haptic user interface to simulate manipulation of the real three-dimensional object.

11. The apparatus of claim 7, wherein the haptic user interface is to include one or more materials selected from electroactive polymers, ionic polymer-metal composites, piezoelectric materials, microfluidic materials, or electrostatic materials.

12. A method comprising:
    recording levels of flexure and forces of reaction detected at a haptic user interface arising from manipulation of a real three-dimensional object lying outside of the haptic user interface by the haptic user interface, wherein the forces of reaction are equal in magnitude and opposite in direction to forces applied to the three-dimensional object by the haptic user interface;
    generating a digital electrical representation of the real three-dimensional object from the recorded levels of flexure and forces of reaction and from a visual image of the real three-dimensional object; and
    determining, based on the digital electrical representation of the real three-dimensional object, an amount of flexure to be applied to each of different segments of the haptic user interface to simulate manipulation of the real three-dimensional object.

13. The method of claim 12, wherein recording forces includes measuring electrical parameters from the haptic user interface during manipulation of the real three-dimensional object.

14. The method of claim 12, wherein the visual image is a three-dimensional visual image of the real three-dimensional object.

15. The method of claim 12, further comprising determining a degree of rigidity to be applied to each of the different segments of the haptic user interface to simulate manipulation of the real three-dimensional object.

16. The method of claim 15, further comprising determining electrical parameters to create each degree of rigidity and each level of flexure to be applied to the different segments of the haptic user interface to simulate manipulation of the real three-dimensional object.

17. At least one computer readable storage medium comprising a set of instructions which, when executed by a computing device, cause the computing device to:

record levels of flexure and forces of reaction detected at a haptic user interface arising from manipulation of a real three-dimensional object lying outside of the haptic user interface by the haptic user interface, wherein the forces of reaction are equal in magnitude and opposite in direction to forces applied to the three-dimensional object by the haptic user interface;

generate a digital electrical representation of the real three-dimensional object from the recorded levels of flexure and forces of reaction and from a visual image of the real three-dimensional object; and determine, based on the digital electrical representation of the real three-dimensional object, an amount of flexure to be applied to each of different segments of the haptic user interface to simulate manipulation of the real three-dimensional object.

18. The at least one computer readable storage medium of claim 17, wherein the instructions, when executed, cause the computing device to measure electrical parameters from the haptic user interface during manipulation of the real three-dimensional object.

19. The at least one computer readable storage medium of claim 17, wherein the visual image is a three-dimensional visual image of the real three-dimensional object.

20. The at least one computer readable storage medium of claim 17, wherein the instructions, when executed, cause the computing device to determine electrical parameters to create each degree of rigidity and each level of flexure to be applied to the different segments of the haptic user interface to simulate manipulation of the real three-dimensional object.

* * * * *